United States Patent [19]

Nakamura et al.

[11] Patent Number: 5,795,527
[45] Date of Patent: Aug. 18, 1998

[54] METHOD OF MANUFACTURING DECORATED ARTICLE USING A TRANSFER MATERIAL

[75] Inventors: Yuzuo Nakamura; Masayuki Kyomen, both of Kyoto; Soichiro Asada, Ogaki; Toshiyuki Matsunami, Ogaki; Hiroyuki Suzuki, Ogaki; Satoru Kawai, Ogaki, all of Japan

[73] Assignees: Nissha Printing Co., Ltd., Kyoto; Pacific Industrial Co., Ltd., Ogaki, both of Japan

[21] Appl. No.: 235,858

[22] Filed: Apr. 29, 1994

[51] Int. Cl.$^6$ .................................................. B29C 31/06
[52] U.S. Cl. .......................... 264/267; 154/294; 156/221; 156/224
[58] Field of Search .................... 425/112, 126 R, 425/129 R, 221, 224, 245; 156/90, 221, 224, 245; 264/510, 511, 513, 509, 267

[56] References Cited

U.S. PATENT DOCUMENTS

| 4,148,967 | 4/1979 | Satoh et al. ........................ 428/416 |
| 4,360,329 | 11/1982 | Hatakeyama ........................ 425/112 |
| 4,418,033 | 11/1983 | Hatakeyama ........................ 264/509 |
| 4,650,533 | 3/1987 | Parker et al. ........................ 156/219 |
| 4,812,186 | 3/1989 | McConnell et al. ........................ 156/90 |

FOREIGN PATENT DOCUMENTS 6-71692  3/1994  Japan.

*Primary Examiner*—Merrick Dixon
*Attorney, Agent, or Firm*—Wenderoth, Lind & Ponack, L.L.P.

[57] ABSTRACT

A decorative transfer material includes a base film, a decorative metal vapor deposition layer, a metallic reinforcing layer covering the whole rear face of the metal vapor deposition layer to thereby reinforce the metal vapor deposition layer, a retainer layer for securing the metallic reinforcing layer to the base film, and an adhesive layer for bonding the metallic reinforcing layer to a to-be-decorated object molded by resin. The metallic reinforcing layer is formed of a metallic powder resin layer or a metallic foil layer. After the transfer material is set in dies for injection molding, the dies are closed. Simultaneously with formation of synthetic resin injected into the in-mold dies, the resin is bonded with the metallic reinforcing layer of the transfer material by the adhesive layer. Thereafter, the in-mold dies are opened and the base film of the transfer material is removed, whereby a decorated article is obtained.

10 Claims, 7 Drawing Sheets

METHOD OF MANUFACTURING DECORATED ARTICLE USING A TRANSFER MATERIAL

BACKGROUND OF THE INVENTION

The present invention relates to a decorative transfer material for realizing a metallic luster by transferring a metal vapor deposition layer to a to-be-decorated object, and a method of manufacturing a decorated article using the transfer material. More specifically, the present invention relates to a transfer material for transferring a metal vapor deposition layer to wheel covers, emblems or other exterior articles of automobiles, and to a method of manufacturing the wheel covers, etc. using the transfer material.

Conventionally, the metallic luster on the surfaces of the exterior articles has been realized according to the following two methods:

(1) painting the surface of an exterior article with resin having metallic powders kneaded therein;

(2) after preparing a deposited transfer material by sequentially laminating a release layer, an anchor layer, a metal vapor deposition layer, and an adhesive layer on a base film, overlaying the adhesive layer of the transfer material onto the surface of an exterior article and adding heat and pressure, and then removing only the base film, to thereby transfer each of the release layer, anchor layer, metal vapor deposition layer, and adhesive layer (namely, a transfer layer of the transfer material) to the surface of the exterior article. In another method, deposited transfer material is inserted into dies for injection molding and molding resin is injected therein, to thereby form an exterior molded article and simultaneously transfer the transfer layer to the surface of the molded article.

According to the above method (1), the metallic luster on the surface of the exterior article is lacking because the resin containing the metallic powders is used. Since the resin containing the metallic powders is exposed on the surface of the exterior article, the metallic powders are subjected to corrosion by rain or oxygen in the air, to thereby deteriorate the metallic luster on the surface of the exterior article.

According to the above method (2), since the film thickness of the metal vapor deposition layer is as small as 0.04–0.08 μm, the film of the metal vapor deposition layer is corroded by the rain or oxygen in the air, resulting in degradation of the metallic luster on the surface of the exterior article. Although it may be proposed to extend the vapor deposition time or perform the vapor deposition twice to form a double metal vapor deposition layer, if the metal vapor deposition layer is formed thick, cracks are generated in the layer when the deposited transfer material is pressed into a corner of the article having a large bending angle by the heat and pressure during transfer or by the pressure of the molding resin, whereby the metallic luster on the surface of the exterior article is partially lost. If the metal vapor deposition layer is formed too thick, the thickness becomes irregular during forming of the layer of the metal vapor deposition film cracks. These kinds of drawbacks are detected in a deposited aluminum film, for example, when the film is larger than 0.05 μm thick. As is understood from the manufacturing principle of the deposited aluminum film, since the aluminum particles are simply overlapped at random, no strong bonding or coupling force is present between the aluminum particles. Therefore, it is impossible to make the aluminum layer strong only by increasing the thickness. If the deposited aluminum layer is used for the exterior articles of vehicles such as wheel covers or the like, the deposited part is corroded by the moisture invading the hard coat layer, or the chlorine existing in the periphery because of the small thickness of the layer, resulting in the formation of pin holes. In other words, a so-called pitting corrosion is brought about. Furthermore, if the moisture enters the pin holes, the corrosion spreads, turning aluminum of the deposited layer to white aluminum hydroxide $Al(OH)_3$. The natural sheen of the deposited aluminum layer is consequently broken. When the pin holes penetrate the deposited aluminum layer, the undercoating resin comes to appear on the surface of the exterior article. Similarly, when the surface of the exterior article is damaged by pebbles or sand, the deposited aluminum layer is lost and the undercoating resin is exposed.

SUMMARY OF THE INVENTION

The object of the present invention is therefore to provide a decorative transfer material which does not cause deterioration of the metallic luster of a metal vapor deposition layer due to corrosion or cracks, and a method of manufacturing a decorated article using the transfer material.

In order to accomplish the object, according to one aspect of the present invention, there is provided a method of manufacturing a decorated article using the transfer material wherein the transfer material includes a base film, a decorative metal vapor deposition layer, a metallic reinforcing layer covering the whole rear surface of the metal vapor deposition layer to thereby reinforce the metal vapor deposition layer, a retainer layer for holding the metallic reinforcing layer on the base film, and an adhesive layer for bonding the metallic reinforcing layer to a to-be-decorated object molded from resin. According to the manufacturing method, after the transfer material is set in in-mold dies and then the dies are closed, synthetic resin is injected into the dies for resin molding, and simultaneously with this, the synthetic resin and the metallic reinforcing layer of the transfer material are bonded to each other by the adhesive layer. Thereafter, the dies are opened and the base film of the transfer material is removed, whereby the decorated article is obtained.

According to another aspect of the present invention, there is provided a decorative transfer material which has a base film, a metal vapor deposition layer, an anchor layer covering the surface of the metal vapor deposition layer, a colored layer with a metallic reinforcing layer covering the whole rear surface of the metal vapor deposition layer to thereby reinforce the metal vapor deposition layer, a retainer layer for securing the colored layer to the base film, and an adhesive layer for bonding the colored layer to a to-be-decorated object.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
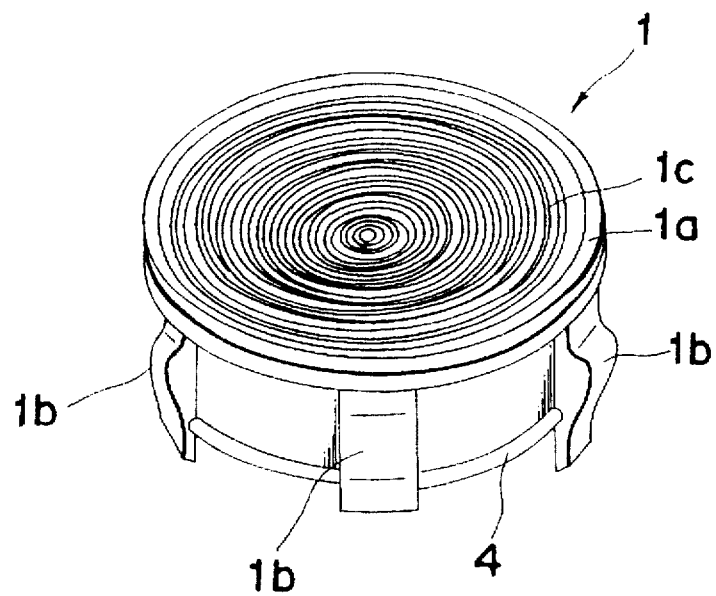
FIG. 1 is a perspective view showing a resin wheel cover manufactured by a method of manufacturing a decorated article according to an embodiment of the present invention.

Before the description of the present invention proceeds, it is to be noted that like parts are designated by like reference numerals throughout drawings.

As a method of manufacturing a decorated article using a transfer material according to one embodiment of the present invention, a method of manufacturing a resin wheel cover will be discussed in detail with reference to FIGS. 1–5.

The structure of a resin wheel cover to be manufactured by the aforementioned method will be explained first.

Figure 2:
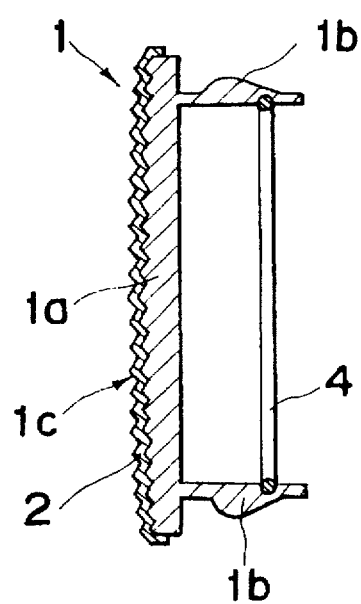
FIG. 2 is a longitudinal side sectional view of the resin wheel cover of FIG. 1.

FIG. 1 shows a resin wheel cover as a decorated article which has a surface decorated at the same time that an injection molding is performed by an in-mold apparatus (not shown) having an injection molding machine and a feeding device for feeding a transfer material. FIG. 1 is a perspective view of a relatively small wheel cover made of a resin to be used to close the central opening of an aluminum wheel. FIG. 2 is a longitudinal side sectional view of the wheel cover. Each transfer material 11, 12 used for manufacturing the wheel cover 1 has a base film 2a, a colored layer 2d, 2n having a metal vapor deposition layer 2g with a decorative feature and a metallic reinforcing layer 2h, 2i covering the whole rear face of the metal vapor deposition layer 2g to reinforce the layer 2g, a hard coat layer 2c as a retainer layer to hold the colored layer 2d, 2n on the base film 2a, a release layer 2b for enhancing the release properties between the hard coat layer 2c and the base film 2a, and an adhesive layer 2e for bonding the metallic reinforcing layer 2h, 2i to a main body of the wheel cover formed of resin.

Figure 15:
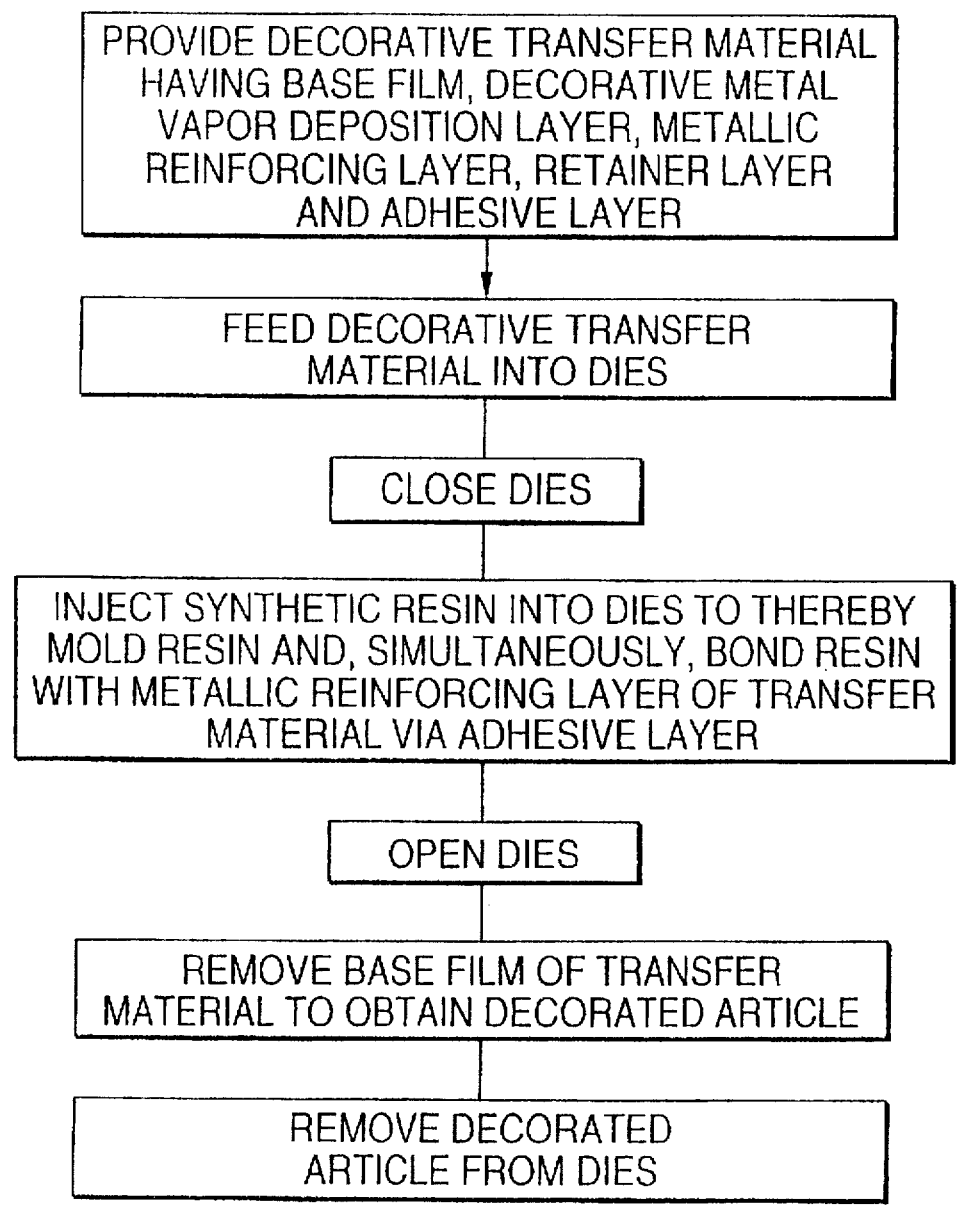
FIG. 15 is a flow chart of the method of manufacturing the resin wheel cover of FIG. 1.

As shown in FIG. 15, according to the manufacturing method, after a decorative transfer material 11 or 12 is put in dies for injection molding (not shown) and the dies are closed, synthetic resin is injected into the dies, to thereby mold the resin and at the same time bond the resin with the transfer material 11 or 12 via the adhesive layer 2e thereof. When the dies are opened and the base film 2a of the transfer material 11 or 12 is removed, the wheel cover 1 is obtained. The wheel cover 1 has a continuous, concentric spin-processed part 1c of a sawtooth or wave-like cross section formed by the resin molding process on the surface of a design face 1a, and simultaneously with the formation of the above part 1c, a transfer layer 2 of the transfer material 11 or 12 formed by the base film 2a, release layer 2b, hard coat layer 2c, colored layer 2d, and adhesive layer 2e is integrally formed on the surface of the spin-processed part 1c by an in-mold transfer method.

In the figures, 4 represents a spring ring secured to holder parts 1b of the wheel cover after molding so as to detachably mount the wheel cover 1 to an aluminum wheel (not shown).

Figure 3:
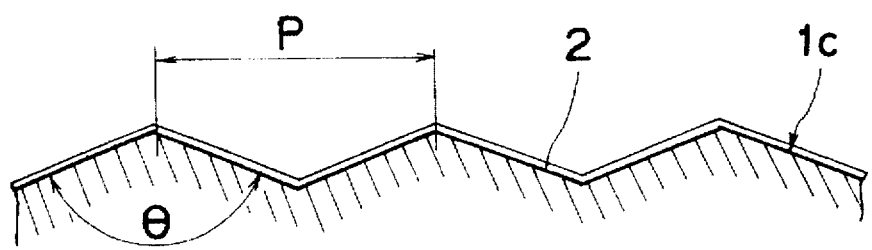
FIG. 3 is a partially-enlarged longitudinal side sectional view of FIG. 2.
Figure 4:
FIG. 4 is a partial sectional view to explain the state of a section of the surface of an aluminum wheel to which the wheel cover is to be mounted.

When the wheel cover 1 manufactured in the above manner is mounted to an aluminum wheel, the cut pattern on the surface of the aluminum wheel shown FIG. 4 can be matched with the design on the surface of the wheel cover of FIG. 3.

The wheel cover 1 is molded of resin material, for example, polypropylene, ABS, polycarbonate, modified PPO., or polyamide, and is provided with the design face 1a, a plurality of the holder parts 1b, the spin-processed part 1c molded on the surface of the design face, and the transfer layer 2 of the transfer material 11 or 12 integrally formed on the surface of the spin-processed part 1c by the in-mold transfer method, as described hereinabove.

The transfer material is roughly classified into two kinds of materials 11 and 12. The transfer material 11 has, in the colored layer 2d, 2n, the metal vapor deposition layer 2g and a metallic powder resin layer 2h covering the whole rear face of the metal vapor deposition layer 2g and reinforcing the metal vapor deposition layer 2g as a metallic reinforcing layer. On the other hand, the transfer material 12 has the metal vapor deposition layer 2g and a metallic foil layer 2i as the metallic reinforcing layer within the colored layer 2d, 2n.

Figure 5:
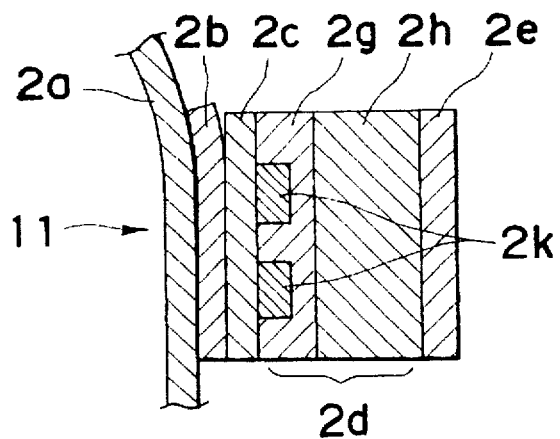
FIG. 5 is a longitudinal side sectional view of a transfer material according to an embodiment of the present invention which is used in the above manufacturing method of the embodiment.

In the first place, as a transfer material according to an embodiment of the present invention, the transfer material 11 will be schematically depicted with reference to FIG. 5 which shows the colored layer 2d having the metal vapor deposition layer 2g and metallic powder resin layer 2h. The transfer material 11 is composed of the base film 2a for feeding the transfer material 11 continuously during the in-mold processing, the release layer 2b providing superior abrasion resistance at its transfer surface and having superior release properties from the base film 2a and made of synthetic resin, the hard coat layer 2c functioning as a retainer layer to hold the colored layer or the like to the base film 2a and preventing the surface of the wheel cover from being damaged by a washing brush during car washing, the colored layer 2d of a desired color, and the adhesive layer 2e fused to the surface of the spin-processed part 1c. Accordingly, a transfer layer of the transfer material 11 is formed of the release layer 2b, hard coat layer 2c, colored layer 2d, and adhesive layer 2e (i.e. all layers of the transfer material 11 except the base film 2a). The colored layer 2d includes the metal vapor deposition layer 2g, which may be a deposited aluminum layer with a design 2k, and a metallic pigment layer 2h of generally the same color as aluminum and located at the rear face of the metal vapor deposition layer 2g.

The metal vapor deposition layer 2g is disposed on the surface of the wheel cover via the pigment layer 2h which has a thickness of several tens of μm and is generally the same color as the metal vapor deposition layer 2g. Moreover, the surface of the metal vapor deposition layer 2g is covered with the hard coat layer 2c. Therefore, even if the metal vapor deposition layer 2g is corroded to thereby form pin holes, only the pigment layer 2h comes out on the surface, side. Since the pigment layer 2h has approximately the same color as that of the metal vapor deposition layer 2g, the pin holes are less striking and barely noticeable. Moreover, the pigment layer 2h can work to prevent damage to the main body of the wheel cover.

If an ultraviolet absorbent such as benzotriazoles is included in the release layer 2b or adhesive layer 2e of the transfer material, the weatherability of the wheel cover 1 can be improved. The benzotriazole absorbent used as the ultraviolet absorbent is effective to prevent fading of the metal vapor deposition layer 2g caused by the ultraviolet rays included in the sunshine or rainwater and thus becoming transparent, thereby improving the weatherability.

Figure 6:
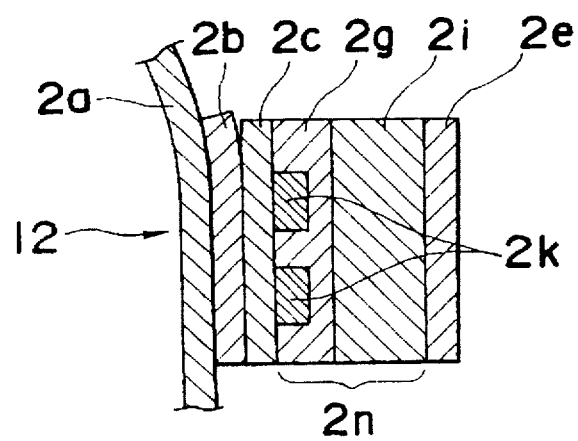
FIG. 6 is a longitudinal side sectional view of a transfer material in a different embodiment of the present invention which is used in the above manufacturing method.

Now, the transfer material 12 having the metal vapor deposition layer 2g and the metallic foil layer 2i within the colored layer 2n will be discussed below as another embodiment of the present invention. FIG. 6 schematically indicates the transfer material 12 according to this embodiment. The transfer material 12 is different from the embodiment of FIG. 5 only in the colored layer 2n. The aluminum foil layer 2i of a general aluminum foil is provided at the rear face of the metal vapor deposition film 2g (thickness 500 Å=0.05 μm). In other words, according to this embodiment of the transfer material 12, the metal vapor deposition film 2g is set at the front side of the design face to utilize the luster, while the known aluminum foil layer 2i located at the rear surface of the metal vapor deposition layer 2g can make up for lack of durability and marring which is a defect of the metal vapor deposition layer 2g. Therefore, even if the metal vapor deposition film 2g is lost through corrosion or damage, the aluminum foil layer 2i which is the same aluminum as the metal vapor deposition layer makes up for the lost portion of the film 2g although the luster is a little different, so that the corroded or damaged portion is hard to notice. If the aluminum foil layer 2i is formed 5-20 μm thick or so, sufficient durability and marring can be ensured as compared with the case where there is provided only the metal vapor deposition film 2g.

In the above-described manufacturing method of wheel covers according to the embodiment of the present invention, the transfer material 11, 12 is bonded to the spin-processed part 1c of the design face 1a of the main body by the in-mold transfer method, to thereby form the resin wheel cover 1. Accordingly, not only are the appearance and taste of the design of the wheel cover 1 improved, but the resistance to corrosion and marring can be increased. In comparison with the conventional manufacturing method, the present manufacturing method can be simple and can remarkably improve the resistance to corrosion and marring.

Hot stamping is a modified embodiment of the above manufacturing method according to the embodiment. Concretely, in the hot stamping, the transfer material 11 or 12 is set so that the adhesive layer 2e of the transfer material is in touch with a to-be-transferred object, and then the transfer material 11 or 12 is pressed to the to-be-transferred object by an elastic roll or a metallic mold (die) which is heated, whereby the adhesive layer 2e is bonded to the to-be-transferred object. The base film 2a is detached thereafter. The same effect is attained in this hot stamping method as in the foregoing embodiment.

Modifications of the transfer material shown in FIGS. 5 and 6 according to embodiments of the present invention will be described in detail hereinbelow.

Modified examples of the transfer material 11 of FIG. 5 will be first described with reference to FIGS. 7–11. Although the hard coat layer 2c as the retainer layer of the transfer material 11 in the embodiment of FIG. 5 fundamentally serves to enhance the release properties between the base film 2a and the colored layer 2d, it is designed to function also as a hard coating layer. For simplification of the description, it will be described by describing modifications of a layer without a hard coating function.

Figure 7:
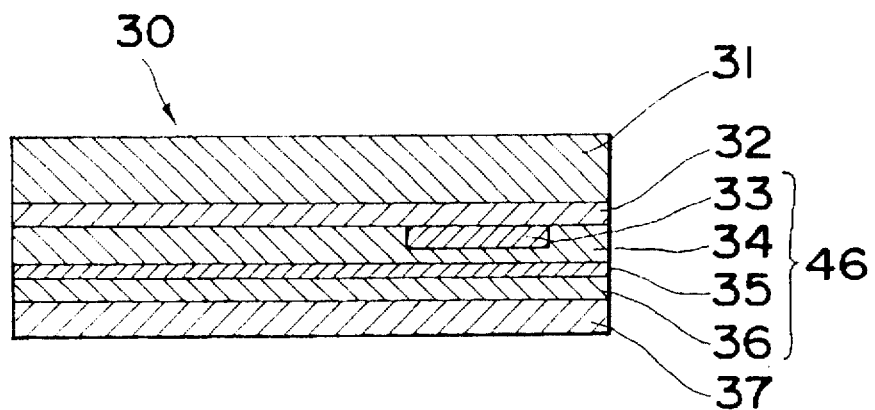
FIG. 7 is a longitudinal side sectional view showing a transfer material as a modification of the embodiment of FIG. 5.

FIG. 7 shows a transfer material modified relative to the embodiment of FIG. 5. A transfer material 30 has a release layer 32, a colored layer 46, and an adhesive layer 37 sequentially formed on a base film 31. The colored layer 46 includes a pattern layer 33, an anchor layer 34, a metal vapor deposition layer 35, and a metallic powder resin layer 36.

The base film 31 is a plastic film of polyethylene terephthalate, polypropylene, polyethylene, nylon, or cellophane, or a composite film of one or more of these kinds of plastics with a paper, which is used in a known transfer material. Although the functional film 31 is removed in many cases after the transfer, it may be left as it is in some cases and used as a kind of protecting layer.

The release layer 32 has a function to hold the other layers to the base film 31 before the transfer, but is releasable from the base film 31 after the transfer. If the decorated article is an exterior the decorated article is an exterior article, the release layer 32 serves as the front face of the exterior article. Therefore, the release layer 32 is required to be physically and chemically tough. The release layer 32 can be formed by a known printing method such as gravure printing, screen printing, or a roll coater method with the use of resin such as acrylic resin, hydrocarbon resin, chlorinated olefin resin, or wax such as paraffin wax or synthetic wax. In the case where the release layer 32 is used without removing the base film 31 after the transfer material is transferred to the to-be-transferred object, the release layer 32 works as a retainer layer to couple the base film 31 with the other layers.

The pattern layer 33 is formed on the release layer 32 by a known printing method such as gravure printing or screen printing with the use of a dye and a pigment of a desired color as a coloring matter, using resin of vinyl chloride-vinyl acetate copolymer, polyamide, polyester, polyacryl, polyurethane, polyvinyl acetal, or chlorinated rubber as a binder.

The anchor layer 34 is formed to prevent dulling of vapor deposition caused during the metal vapor deposition or yellowing of vapor deposition caused during transfer and decorating, and moreover closely holds the release layer 32 in touch with the metal vapor deposition layer 35 so that they will not easily separate from each other, to thereby secure the beautiful metallic luster of the metal vapor deposition layer 35. The layer 34 can be formed of urethane resin, pyroxylin, copolymer resin of vinyl chloride and vinyl acetate and maleic acid, an acrylic resin, or the like by a known printing method, for instance, gravure printing or screen printing, etc.

For obtaining the metal vapor deposition layer 35, gold, silver, nickel, aluminum, chromium, titanium, or an alloy of such metals showing metallic luster is used. The metal can be processed through vacuum evaporation, sputtering, electron beam treatment, or ion plating, etc.

Meanwhile, the metallic powder resin layer 36 can be composed of resin having metallic powders dispersed therein by a known printing method, for example, gravure printing or screen printing, wherein the resin is acrylic resin, acryl vinyl resin, vinyl urethane resin, urethane acryl resin, urethane vinyl resin, or the like, and the metallic powders are gold powders, silver powders, copper powders, nickel powders, aluminum powders, chromium powders, titanium powders, powders of alloys of such metals, powders of a metallic pigment, or the like. It is preferable that the metallic powders are of the same color as the metal vapor deposition layer 35. At the same time, a suitable thickness of the resin layer 36 is 1–20 μm thick. When the thickness is smaller than 1 μm, the opacifying effect to shield the main body of the wheel cover cannot be gained. If the resin layer 36 is thicker than 20 gm, the layer 36 is difficult to delaminate and not fit for gravure printing as well as screen printing. The particle size of the metallic powders is desirably 5–20 μm and the content of the metallic powders is favorably 20–50%.

The adhesive layer 37 is provided to securely bond the transfer layer of the transfer material 30 to the surface of the exterior article with heat and pressure. The material used for the layer 37 is required to be properly changed depending on the kind of the exterior article. For instance, when the exterior article is made of polystyrene, acrylonitrile-styrene, acrylonitrile-butadiene-styrene copolymer, methyl metacrylate, Noryl (trade name of polyphenylene oxide by Nippon G. E., Inc.), or polycarbonate, binder of acrylic resin, styrene resin, etc. is employable. When the exterior article is formed of polyethylene or polypropyrene or the like, chlorinated polyolefin resin, chlorinated ethylene-vinyl acetate-copolymer resin, cyclized rubber, or cumarone-indene resin, etc., can be used as binder. If the exterior article is made of chlorinated vinyl resin, it is possible to use chlorinated vinyl-vinyl acetate copolymer resin. Saturated polyester resin or pyroxylin, etc. can also be used corresponding to the other kinds of material of the exterior article. The adhesive layer 37 is provided by a known printing method such as gravure printing or screen printing, or a roll coater method.

An actual example of the modification of FIG. 7 will be discussed now. Specifically, the base film is formed 25–38 μm thick of polyester resin, the release layer is formed 1–2 μm thick of acrylic resin and solvent, the pattern layer is 1–2 μm thick and formed of transparent color pigment such as diazo yellow HR, acrylic resin, and solvent, the anchor layer is 1–2 μm thick and formed of urethane resin, the metal vapor deposition layer is 0.06 μm thick and formed of aluminum, the metallic powder layer is 10 μm thick made and formed of aluminum powders, acrylic resin, and solvent, and the adhesive layer is 2 μm thick and formed of acrylic resin.

As a comparative example 1, a deposited transfer material having the release layer, an anchor layer, a 0.06 μm thick metal vapor deposition layer, and an adhesive layer sequentially formed on the base film is prepared. At the same time, a comparative example 2 of a deposited transfer material having a release layer, an anchor layer, a metal vapor deposition layer of 0.2 μm thickness, and adhesive layer sequentially laminated on the base film is prepared.

Each of the three aforementioned kinds of transfer material is put in injection dies and molding resin is injected into a cavity according to the manufacturing method, whereby an exterior molded article is obtained. Simultaneously with the formation of the molded article, the transfer layer of the transfer material is transferred to the surface of the molded article. An exterior article is thus produced. Since the film thickness of the metal vapor deposition layer in the transfer material of the comparative example 1 is small, no crack is generated, but the transfer material is quickly corroded when exposed to ultraviolet rays and sprayed salt water for 1000 hours. The metallic luster fades away. In contrast to this, although the metal vapor deposition layer 35 of the transfer material according to the modification of the embodiment of the present invention is corroded approximately at the same stage as the comparative example 1, the metallic luster of the metallic powder layer 36 compensates for the corroded portion, and therefore the metallic luster of favorable luminance is maintained as a whole.

On the other hand, according to the deposited transfer material of the comparative example 2, because of the large thickness of the metal vapor deposition layer, the metal vapor deposition layer induces cracks when the transfer material is pressed by the molding resin to a corner of a large bending angle, resulting in the partial deterioration of the metallic luster. To the contrary, even if cracks are generated in the metal vapor deposition layer 35 of the transfer material according to the modification and the metallic luster of the metal vapor deposition layer 35 is partially worsened, the portion is made up for by the metallic luster of the metallic powder layer 36, thereby representing the metallic luster of favorable luminance.

Figure 8:
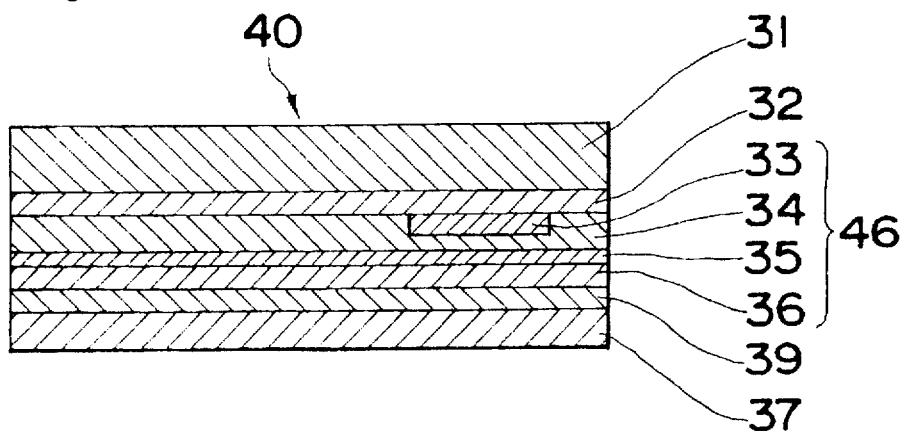
FIG. 8 is a longitudinal side sectional view showing a transfer material as a further modification of the embodiment of FIG. 5.

A transfer material 40 as a different modification of the embodiment of FIG. 5 is shown in FIG. 8. The transfer material 40 of the modification has an assisting pigment layer 39 between the metallic powder resin layer 36 and the adhesive layer 37 so as to adjust the tone of the resin layer 36. The other points of the constitution are the same as in the transfer material 30 in FIG. 7.

The assisting pigment layer 39 referred to above can be formed of material containing known color pigment in a similar resin to the resin of the layer 36 by a known printing method such as gravure printing, screen printing or the like. Since the assisting pigment layer 39 is provided so as to adjust the tone of the resin layer 36, a well-known white organic or inorganic pigment can be used if it is necessary to improve the opacifying effect of the main body of the wheel cover by the resin layer 36. Alternatively, if a deep tone is required for the resin layer 36, the assisting pigment layer 39 can be formed of a known white organic or inorganic pigment.

Figure 9:
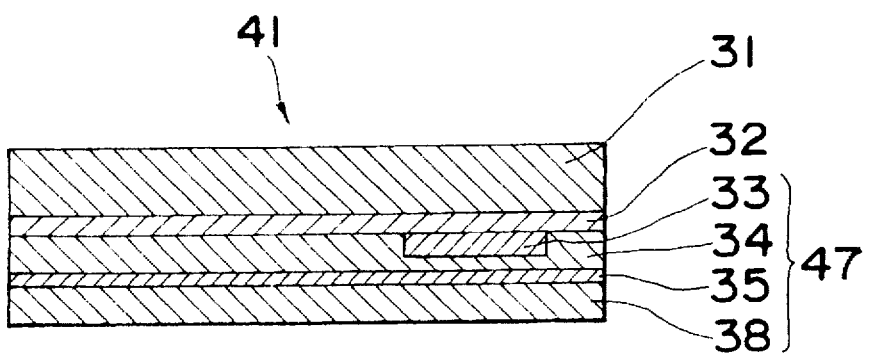
FIG. 9 is a longitudinal side sectional view showing a transfer material as a still further modification of the embodiment of FIG. 5.

A transfer material 41 according to a still further modification of FIG. 5 is shown in FIG. 9. In the transfer material 41 of FIG. 9, two layers, namely, the metallic powder resin layer 36 and the adhesive layer 37 of the transfer material 30 in FIG. 7 are constituted of a single adhesive layer 38 including metallic powders. The adhesive layer 38 with the metallic powders is formed on the metal vapor deposition layer 35 as a part of a colored layer 47.

The above adhesive layer 38 with metallic powders can be formed by a known printing method, for example, gravure printing or screen printing with the use of metallic powders such as aluminum powders or the like which are dispersed in resin binder, e.g., acrylic resin, styrene resin, chlorinated polyolefin, chlorinated ethylene-vinyl acetate copolymer resin, cyclized rubber or cumarone-indene resin. Therefore, since the number of layers is reduced by one, the forming process of the layers is simplified and less costly.

Figure 10:
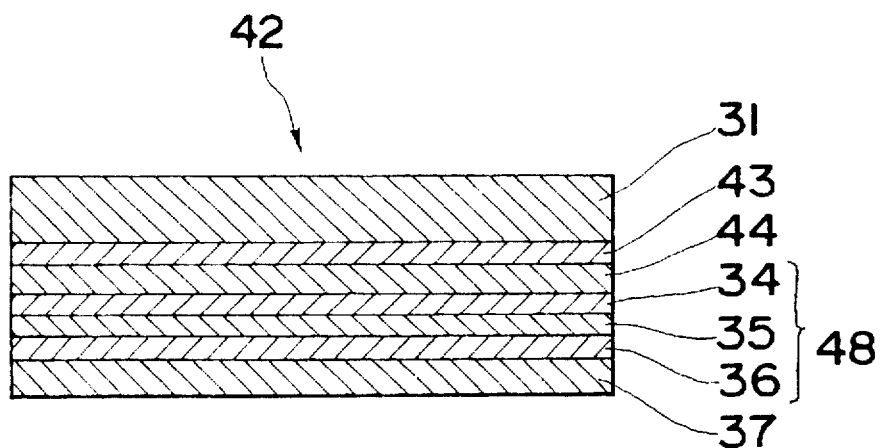
FIG. 10 is a longitudinal side sectional view showing a transfer material as another modification of the embodiment of FIG. 5.

FIG. 10 indicates a transfer material 42 according to yet another modification of the transfer material of FIG. 5. In the transfer material 42, the release layer is formed as a hard coat layer 44 between the anchor layer 34 and the base film 31 having release properties by adding a hard coat function to the release layer. The transfer material 42 shows a more practical construction of the transfer material 11 of FIG. 5.

A release layer 43 is formed on the surface of the base film 31 having the release properties where the hard coat layer 44 is to be formed. The release layer 43 composed of such resin as epoxy resin, melamine resin, epoxy-melamine copolymer resin, or the like is detached from the surface of the hard coat layer 44 along with the base film 31 after the transfer layer of the transfer material 42, i.e., hard coat layer 44, colored layer 48 (including anchor layer 34, metal vapor deposition layer 35, metallic powder resin layer 36), and adhesive layer 37 are transferred to the exterior article. At this time, the release layer 43 may be totally removed due to the base film 31 without being left on the hard coat layer 44, or the release layer 43 may partly remain on the hard coat layer 44, depending on the material or the separating condition of the layer 43. Ultraviolet curing resin or electron beam curing resin is used to form the hard coat layer 44 by a known printing method, for example, gravure printing or screen printing. The ultraviolet curing resin is composed of, for instance, prepolymer having reactive double-bond or reactive epoxy group, polyfunctional oligomer, reactive diluent, or photo-initiator, etc. The electron beam curing resin is formed of, for example, prepolymer having reactive double-bond or reactive epoxy group, polyfunctional oligomer, reactive diluent, or the like.

The transfer material in accordance with the various modifications of the above-described embodiments has the metallic powder resin layer at the to-be-transferred side of the metal vapor deposition layer so as to display the metallic luster. The metallic powder resin layer is considerably tough and stiff in comparison with the metal vapor deposition layer to the corrosion caused by the rain or oxygen in the air or bending. Therefore, degradation due to corrosion of the metallic luster of the metal vapor deposition layer is compensated for by the metallic powder resin layer. Moreover, decrease in the metallic luster of the metal vapor deposition layer generated during transfer is also compensated for by the metallic powder resin layer. Since the metal vapor deposition layer is reinforced by the metallic powder resin layer, the surface of the to-be-transferred object is well followed.

Figure 11:
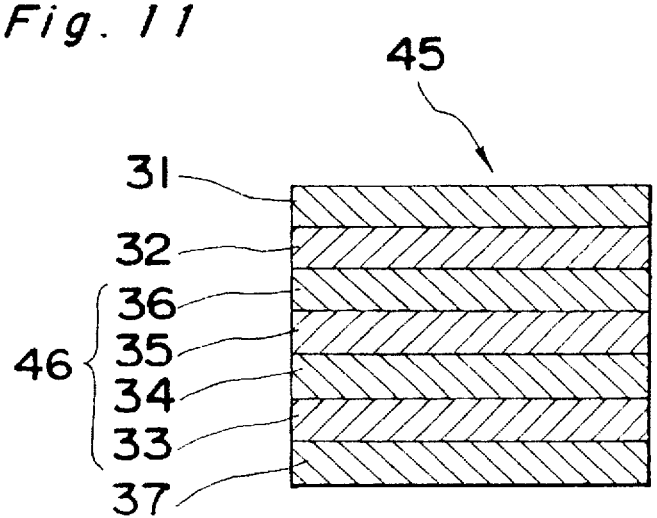
FIG. 11 is a longitudinal side sectional view showing a transfer material as a further modification of the embodiment of FIG. 5.

A transfer material 45 according to another modification of the embodiment of FIG. 5 is shown in FIG. 11. In the transfer material 45, the colored layer 46 composed of the pattern layer 33, anchor layer 34, metal vapor deposition layer 35, and metallic powder resin layer 36 of the transfer material 30 of FIG. 7 is reversed. Therefore, the pattern layer 33 is formed adjacent to the adhesive layer 37 at the to-be-transferred object side, not adjacent to the release layer 32 at the side of the base film 31. Also, the metallic powder resin layer 36 is set adjacent to the release layer 32, not adjacent to the adhesive layer 37. The transfer material 45 is arranged to see the pattern layer 33 through the to-be-transferred object of transparent resin or the like. The modification achieves the same operation and effect as the transfer material 30 of FIG. 7. Since the to-be-transferred object, that is, molding resin is disposed at the front side, the surface strength can be remarkably improved.

Various modifications of the transfer material of FIG. 6 will be described with reference to FIGS. 12–14.

Figure 12:
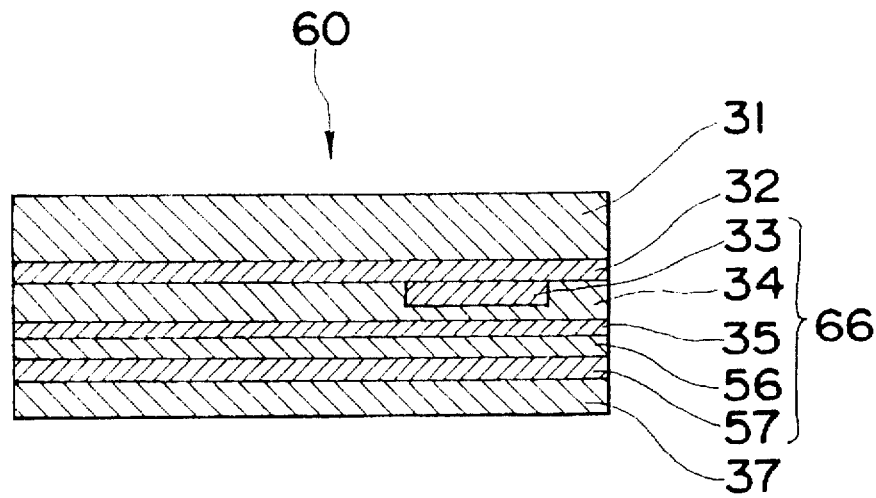
FIG. 12 is a longitudinal side sectional view showing a transfer material as a modification of the embodiment of FIG. 6.

A transfer material 60 according to a modification of the embodiment of FIG. 6 is indicated in FIG. 12. The release layer 32, colored layer 66, and adhesive layer 37 are sequentially formed on the base film 31 in the transfer material 60. The colored layer 66 has the pattern layer 33, anchor layer 34, metal vapor deposition layer 35, laminating agent layer 56, and metallic foil layer 57.

Each of the base film 31, release layer 32, pattern layer 33, anchor layer 34, metal vapor deposition layer 35, and adhesive layer 37 is the same in constitution as in the transfer materials of the modifications of FIGS. 7–11. An anchor layer of the same properties as the above anchor layer 34 can be interposed between the metallic foil layer 57 and adhesive layer 37.

To form the metallic foil layer 57, a metallic foil, e.g., an aluminum foil, which is formed by extending metal such as aluminum to become thin until the thickness is 5–20 μm is used, or a gold foil, a silver foil, a copper foil, a nickel foil, a chromium foil, a titanium foil, or a foil comprising an alloy of the above kinds of metal can be used. The color of the layer 57 is desirably the same as that of the metal vapor deposition layer 35. The metallic foil layer 57 is 5–20 μm thick and favorably formed over the entire surface where the metal vapor deposition layer 35 is present. If the thickness of the metallic foil layer 57 is smaller than 5 μm, the layer 57 is easy to cut and impossible to laminate. If the metallic foil layer 57 is formed to be thicker than 20 μm, it is too hard to bend, decreasing the processability during transfer. The foil layer 57 can be formed on the metal vapor deposition layer 35 by laminating or the like. More specifically, a film-like structure of the release layer 32, anchor layer 34, and metal vapor deposition layer 35 sequentially layered on the base film 31 is superposed with the metallic foil layer 57 having the laminating agent layer 56 formed of heat-sensitive or pressure-sensitive resin in a manner to hold the metal vapor deposition layer 35 and laminating agent layer 56 in close contact with each other, and heated and pressured by a press roller or a press, to thereby form the metallic foil layer 57 on the metal vapor deposition layer 35. The laminating agent layer 56 is composed of urethane resin, acrylic resin, or an epoxy resin, etc.

An actual example of the transfer material of the modification of FIG. 12 will now be discussed below. The transfer material is composed of the base film of polyester resin having a 25–38 μm thickness, the release layer of acrylic resin and solvent of a 1–24 μm thickness, the pattern layer of a transparent color pigment for example, diazo yellow HR, acrylic resin, and solvent having 1–2 μm thickness, the anchor layer of urethane resin of 1–214 μm thickness, the metal vapor deposition layer of aluminum of 0.06 μm thickness, the laminating agent layer of urethane resin of 2–3 μm thickness, the metallic foil layer of aluminum of 7 μm thickness, and the adhesive layer of acrylic resin with a 2 μm thickness.

For a comparative example 1, a deposited transfer material is prepared to have the release layer, the anchor layer, the metal vapor deposition layer of 0.06 μm thickness, and the adhesive layer sequentially laminated on the base film of the comparative example 1. Moreover, for a comparative example 2, a deposited transfer material is prepared to have the release layer, the anchor layer, the metal vapor deposition layer of 0.2 μm thickness, and the adhesive layer laminated sequentially on the base film.

The three aforementioned kinds of the transfer materials are respectively fed into injection dies. When molding resin is injected into a cavity, an exterior molded article is molded and, at the same time, the transfer layer of the transfer material is transferred to the surface of the molded article, whereby an exterior article is obtained. The deposited transfer material of the comparative example 1 does not crack because of the small thickness of the metal vapor deposition layer. However, when the comparative example 1 is exposed to ultraviolet rays and sprayed salt water for 1000 hours, it is rapidly corroded and the metallic luster is deteriorated. In comparing the transfer material of the modification, although the metal vapor deposition layer 35 of the modification is actually corroded approximately at the same stage as the comparative example 1, the corroded portion is made up for by the metallic luster of the metallic foil layer 57, so that a favorable metallic luster is retained as a whole.

In the deposited transfer material of the comparative example 2, since the film thickness of the metal vapor deposition layer is large, the metal vapor deposition layer generates cracks when the transfer material is pressed into a corner with a large bending angle by the molding resin, resulting in the partial deterioration of the metallic luster. According to the transfer material of the modification, even though the metal vapor deposition layer 35 produces cracks to partially deteriorate the metallic luster of the metal vapor deposition layer 35 itself, the cracked portion is compensated for by the metallic luster of the metallic foil layer 57.

Figure 13:
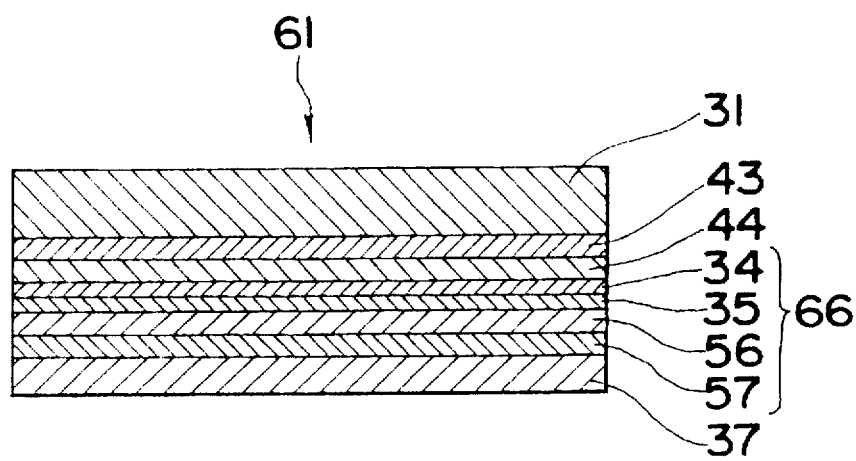
FIG. 13 is a longitudinal side sectional view showing a transfer material as a further modification of the embodiment of FIG. 6.

A transfer material 61 according to another modification of the embodiment of FIG. 6 is indicated in FIG. 13. The transfer material 60 has the hard coat layer 44 similar to that in the modification of FIG. 10 interposed between the anchor layer 34 and the base film 31 with the release properties. The base film 31 with release properties is provided with the release layer 43 at the side where the hard coat layer 44 is to be formed on the base film.

Figure 14:
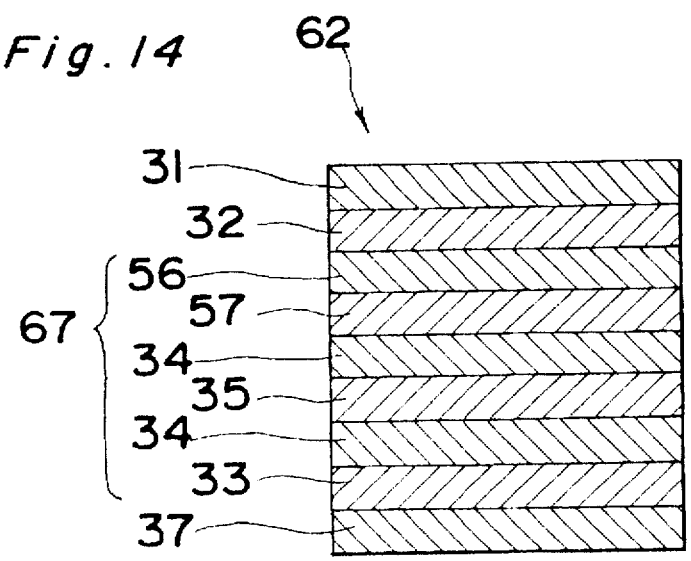
FIG. 14 is a longitudinal side sectional view showing a transfer material as a further modification of the embodiment of FIG. 6.

A transfer material 62 according to a further modification of the embodiment of FIG. 6 is illustrated in FIG. 14. The transfer material 62 is obtained by reversing the colored layer in the transfer material 60 of FIG. 12, so that the pattern layer 33 is formed not adjacent to the release layer 32 at the base film side, but adjacent to the adhesive layer 37 at the to-be-transferred object side and, the adjacent to the layer 56 is provided adjacent to the release layer 32, not adjacent to the adhesive layer 37. The colored layer is formed as a colored layer 67 comprised of the pattern layer 33, anchor layer 34, metal vapor deposition layer 35, anchor layer 34, metallic foil layer 56, and laminating agent layer 56. This transfer material 62 is suitable to see the pattern layer 33 through the to-be-transferred object of transparent resin, etc. The same effect and operation can be achieved also by this modification as by the transfer material 60 in FIG. 12. Since the to-be-transferred object, namely, molding resin is brought to the front side, the surface strength can be furthermore improved.

As depicted hereinabove, since the transfer materials according to the modifications in FIGS. 12–14 are provided with the metal vapor deposition layer 35 and metallic foil layer 57 to present the metallic luster, the metallic luster of the metal vapor deposition layer 35 remains, even if it is deteriorated through corrosion, is due to the provision of the metallic foil layer 57 owing to the higher resistance to corrosion caused by rain or oxygen in the air. The metallic luster worsened as a result of cracks generated in the metal vapor deposition layer 35 during transfer is also compensated for by the metallic foil layer 57. The metallic foil layer 57 is superior in terms of the durability and metallic impression to the metallic powder resin layer described earlier.

In each of the above transfer materials of the various modifications, the release layer and anchor layer can be composed integrally in one unit of acrylic resin, polyester resin, urethane resin, or the like.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A method of manufacturing a decorated resin wheel cover, comprising the steps of:
   providing a decorative transfer material having a base film, a decorative metal vapor deposition layer with a front face facing the base film and a rear face, a metallic reinforcing layer covering all of the rear face of the metal vapor deposition layer to reinforce the metal vapor deposition layer, a retainer layer for holding the metal vapor deposition layer on the base film, and an adhesive layer for bonding the metallic reinforcing layer to an object;
   inserting the decorative transfer material into open in-mold dies;
   closing the in-mold dies;
   molding the resin and, simultaneously, bonding the resin to the metallic reinforcing layer via the adhesive layer;
   opening the in-mold dies;
   removing the base film of the decorative transfer material to leave the decorative metal vapor deposition layer and the metallic reinforcing layer adhered to the molded resin by the adhesive layer, to thereby form the decorated resin wheel cover; and
   wherein said step of molding the resin and, simultaneously, bonding the resin to the metallic reinforcing layer via the adhesive layer comprises molding the resin into a wheel cover shape having a face comprising a spin-processed part formed with an uneven surface and, simultaneously, bonding the reinforcing layer to the uneven surface of the spin-processed part via the adhesive layer.

2. A method of manufacturing a decorated resin wheel cover as recited in claim 1, wherein
   in molding the resin into a wheel cover shape having a face comprising a spin-processed part formed with an uneven surface, the uneven surface is formed in a continuous sawtooth shape.

3. A method of manufacturing a decorated resin wheel cover as recited in claim 1, wherein
   in molding the resin into a wheel cover shape having a face comprising a spin-processed part formed with an uneven surface, the uneven surface is formed in a continuous wave shape.

4. A method of manufacturing a decorated resin wheel cover as recited in claim 1, wherein
   in the step of providing a decorative transfer material, a metallic pigment layer is provided as the metallic reinforcing layer.

5. A method of manufacturing a decorated resin wheel cover as recited in claim 1, wherein
   in the step of providing a decorative transfer material, a metallic foil layer is provided as the metallic reinforcing layer.

6. A method of manufacturing a decorated article, comprising the steps of:
   providing a decorative transfer material having a base film, a decorative metal vapor deposition layer with a front face facing the base film and a rear face, a metallic reinforcing layer covering all of the rear face of the metal vapor deposition layer to reinforce the metal vapor deposition layer, a retainer layer for holding the metal vapor deposition layer on the base film, and an adhesive layer for bonding the metallic reinforcing layer to an object;
   inserting the decorative transfer material into open in-mold dies;

closing the in-mold dies;

injecting synthetic resin into the in-mold dies;

molding the resin and, simultaneously, bonding the resin to the metallic reinforcing layer via the adhesive layer;

opening the in-mold dies;

removing the base film of the decorative transfer material to leave the decorative metal vapor deposition layer and the metallic reinforcing layer adhered to the molded resin by the adhesive layer, to thereby form the decorated resin article; and wherein said step of molding the resin and, simultaneously, bonding the resin to the metallic reinforcing layer via the adhesive layer comprises molding the resin into an article shape having a face comprising a spin-processed part formed with an uneven surface and, simultaneously, bonding the reinforcing layer to the uneven surface of the spin-processed part via the adhesive layer.

7. A method of manufacturing a decorated resin article as recited in claim 6, wherein in molding the resin into a article shape having a face comprising a spin-processed part formed with an uneven surface, the uneven surface is formed in a continuous sawtooth shape.

8. A method of manufacturing a decorated resin article as recited in claim 6, wherein in molding the resin into an article shape having a face comprising a spin-processed part formed with an uneven surface, the uneven surface is formed in a continuous wave shape.

9. A method of manufacturing a decorated resin article as recited in claim 6, wherein in the step of providing a decorative transfer material, a metallic pigment layer is provided as the metallic reinforcing layer.

10. A method of manufacturing a decorated resin article as recited in claim 6, wherein in the step providing a decorative transfer material, a metallic foil layer is provided as the metallic reinforcing layer.

* * * * *

UNITED STATES PATENT AND TRADEMARK OFFICE
CERTIFICATE OF CORRECTION

PATENT NO.   : 5,795,527
DATED        : August 18, 1998
INVENTOR(S)  : Yuzou NAKAMURA et al.

It is certified that error appears in the above-indentified patent and that said Letters Patent is hereby corrected as shown below:

On the cover page, in item [75], "Yuzuo Nakamura" should read --Yuzou Nakamura--.

Signed and Sealed this

Sixteenth Day of March, 1999

*Attest:*

Q. TODD DICKINSON

*Attesting Officer*

*Acting Commissioner of Patents and Trademarks*